United States Patent Office 2,854,467
Patented Sept. 30, 1958

2,854,467

N-HALOALKENYL DITHIOCARBAMATES

Marion W. Harman, Nitro, and John J. D'Amico, Charleston, W. Va., assignors to Monsanto Chemical Company, St. Louis, Mo., a corporation of Delaware No Drawing. Application December 13, 1954
Serial No. 474,984

9 Claims. (Cl. 260—455)

The present invention relates to a new class of dithiocarbamates and derivatives thereof and to the method whereby such products are formed.

Dithiocarbamates, as are known, all contain the characteristic and common grouping

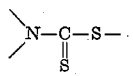

The new compounds comprising the present invention may be represented schematically by the following general formula:

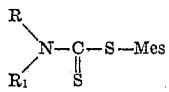

where R represents an alkyl or a cyclic group, $R_1$ represents a halogen substituted alkenyl group and Mes represents an ester, a cyanoalkyl group or a metal which may be mono- or divalent, such for example as sodium, zinc, cadmium and the like. Since thiuram mono- and disulfides are formed by oxidation of a soluble salt of a dithiocarbamate, for example the sodium salt, the thiuram mono- and disulfides of the new class of dithiocarbamate compounds hereinafter described are also within the purview of the present invention, which will be fully understood and aparent from the following examples.

EXAMPLE 1

The amine employed in this example, namely N-(3-chloro-2-butenyl)cyclohexylamine, was obtained by heating 1063 parts (10.7 moles) of cyclohexylamine to substantially 100° C. and, while agitating and maintaining at the specified temperature, adding slowly over approximately a 2 hour period, 625 parts (5.0 moles) of 1,3-dichloro-2-butene. After the last mentioned product was all added, the mixture was heated for about 2 hours at 128–130° C., cooled to about 90° C., whereupon 800 parts (5.0 moles) of 25% caustic soda were added and agitation continued for about 15 minutes. The mixture was then cooled to room temperature, filtered and the top layer which separated from the filtrate was dried over solid caustic soda. The resulting colorless liquid which boiled under 5 mm. pressure at 110–112° C. was found to have a refractive index $n_D^{25} = 1.4880$.

To produce the desired dithiocarbamate, 46.8 parts (0.25 mole) of N-(3-chloro-2-butenyl)cyclohexylamine obtained as described in the preceding paragraph were mixed with 500 parts of water and 40 parts (0.25 mole) of 25% caustic soda. The reaction mixture was agitated and maintained at 25–30° C. while very slowly adding 19 parts (0.25 mole) of carbon disulfide. Stirring was preferably continued for about 3 hours to complete the reaction. The product was a water solution of the sodium salt of N-(3-chloro-2-butenyl)cyclohexyldithiocarbamic acid of the following formula:

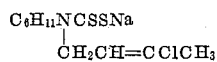

Other metallic salts are readily produced by adding a water solution of a bivalent metallic salt, such as zinc sulfate or copper sulfate to the sodium salt shown and filtering, washing and drying the precipitate. The zinc salt of N-(3-chloro-2-butenyl)cyclohexyldithiocarbamic acid is a white solid melting at 161–164° C., is soluble in ether, benzene, acetone and chloroform, is slightly soluble in light petroleum hydrocarbons and insoluble in alcohol and ethyl acetate. The corresponding cadmium salt is a yellow solid melting at 187–191° C., is soluble in benzene and chloroform, is slightly soluble in acetone and alcohol and is insoluble in ether and water.

EXAMPLE 2

The amine employed in this example, namely N-(2-chloroallyl)cyclohexylamine, was obtained by the same procedure followed in the first paragraph of the previous example except that in place of the dichlorobutene there employed, there was substituted 555 parts (5.0 moles) of 2,3-dichloro-1-propene. The product was a colorless liquid boiling at 83–84° C. under 2 mm. vacuum and having a refractive index $n_D^{25} = 1.4835$.

The dithiocarbamate was produced by the same procedure described in Example 1 but employing as reactants 126 parts (0.726 mole) of N-(2-chloroallyl)cyclohexylamine, 1120 parts of water, 116 parts (0.726 mole) of 25% caustic soda, and 55 parts (0.726 mole) of carbon disulfide. The product was a water solution of the sodium salt of N-(2-chloroallyl)cyclohexyldithiocarbamic acid of the formula:

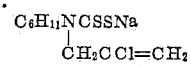

The product in the solid state as a trihydrate is a tan colored solid melting at about 110° C., is soluble in water, acetone and ethyl alcohol and is insoluble in ether, chloroform and heptane. The zinc and cadmium salts of the dithiocarbamate shown immediately above were obtained from the sodium salt by precipitation using solutions of zinc and cadmium sulfate as previously described. The zinc salt of N-(2-chloroallyl)-N-cyclohexyldithiocarbamic acid is a cream colored solid melting at 125–127° C. and having the empirical formula $C_{20}H_{30}Cl_2N_2S_4Zn$. It is soluble in ether, acetone, chloroform, benzene and ethyl acetate and but slightly soluble in heptane and ethyl alcohol. The cadmium salt is a yellow solid melting at 127–129° C. and has the empirical formula $C_{20}H_{30}Cl_2N_2S_4Cd$. It is insoluble in ether, heptane and ethyl alcohol and soluble in chloroform, benzol and hot acetone and ethyl acetate.

EXAMPLE 3

In this example of the invention, 2-chloro-N-isopropyl allylamine is required as a starting material. This amine was obtained by stirring a mixture of 890 parts (15.0 moles) of monoisopropylamine and 380 parts of water while holding the temperature between 42 and 47° C. during the slow addition over a 3-4 hour period of time of 398 parts (3.58 moles) of 2,3-dichloro-1-propene. The mixture was then heated at 60–70° C. for about 4 hours while continuing the stirring. Thereupon, after cooling to room temperature (about 25° C.) 200 parts (5.0 moles) of sodium hydroxide were added, stirring continued for a period of time and the mixture filtered. The top layer separating from the filtrate was dried over solid caustic soda, excess isopropylamine removed by distillation, and the product distilling at 138–140° C. was collected. The chloro-allyl substituted isopropylamine was a colorless liquid having a refractive index $n_D^{25} = 1.4430$.

The sodium salt of a dithiocarbamate was produced by mixing together 33.4 parts (0.25 mole) of 2-chloro-N-isopropyl allylamine, 500 parts of water and 40 parts (0.25 mole) of 25% caustic soda. Thereupon while continuing the agitation and maintaining a temperature of 25–30° C., there were added at a slow rate over a period of time 19 parts (0.25 mole) of carbon disulfide. Stirring was continued for about 2 hours after the addition of all the reactants. The product obtained was a solution of the sodium salt of N-(2-chloroallyl)isopropyldithiocarbamic acid, of the formula:

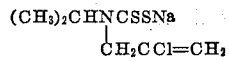

The zinc, cadmium and other heavy metallic salts may, if desired, be obtained from the sodium salt shown and by following the process as described in Examples 1 and 2. The cadmium salt melts at 109–112° C. and the zinc salt melts at 106–110° C.

The N,N-dimethyl cyclohexylamine salt was prepared by reacting equimolar proportions of 2-chloro-N-isopropyl allylamine, N,N-dimethyl cyclohexylamine and carbon disulfide at 25–30° C. The product, M. P. 83–84° C., was obtained in quantitative yield.

EXAMPLE 4

In the production of another dithiocarbamate, 2-chloro - N - (3 - methoxypropyl)allylamine was required. This amine was obtained by slowly adding, over a period of 2 hours, 222 parts (2.0 moles) of 2,3-dichloro-1-propene to 393 parts (4.4 moles) of 3-methoxypropylamine, while maintaining the temperature between 80–105° C. After the addition of the propene, the mixture was stirred for about 2 hours while heating at 145–149° C. and then cooled to about 50° C. Thereupon, 200 parts (2.5 moles) of 50% caustic soda solution were added and stirring continued for about another hour. The mixture, after cooling somewhat, was then filtered to remove any mineral salts present, and the top layer separated from the filtrate and dried over solid caustic soda. The dried liquid was then distilled under 50 mm. pressure and the product collected. The desired amine boiled at 118–120° C. and possessed a refractive index $n_D^{25}$=1.4568. Analysis for chlorine and nitrogen confirmed the desired compound.

The sodium salt of one of the new class of dithiocarbamates was produced by reacting a mixture of 47 parts (0.288 mole) of 2-chloro-N-(3-methoxypropyl)-allylamine, obtained as described in the previous paragraph of this example, and 46 parts (0.288 mole) of 25% caustic soda in 500 parts of water with 21.9 parts (0.288 mole) of carbon disulfide. The procedure for obtaining a dithiocarbamate as described in Examples 1–3 was followed. The product obtained was a solution of the sodium salt of 2-chloro-N-(3-methoxypropyl)allyl-dithiocarbamic acid, of the formula:

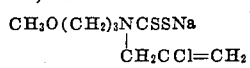

As in the previous examples the zinc, cadmium, iron and other heavy metal salts of this product can readily be obtained from the solution of the sodium salt by adding thereto a water solution of the desired metal compound.

EXAMPLE 5

For the preparation of another dithiocarbamate of the new class of compounds, bis(2-chloroallyl)amine was required. This amine was obtained by adding 200 parts of calcium cyanamid to a stirred mixture of 660 parts of water and 135 parts of cracked ice, holding at a temperature of about 10° C. With continued stirring and with the temperature maintained below 25° C., there were then added 110 parts (2.75 moles) of sodium hydroxide dissolved in 200 parts of water. After about 1 hour under the conditions mentioned, 348 parts (3.14 moles) of 2,3-dichloro-1-propene in 550 parts of ethyl alcohol were added and the mixture heated at reflux temperature for about 5 hours whereupon about 80–85% of the alcohol was removed by distillation and the mass then cooled to room temperature and filtered. The top layer from the filtrate was twice extracted with benzene, the extracts combined and then dried by means of anhydrous sodium sulfate and the benzene removed by distillation. The residue was then distilled under 2 mm. vacuum and the fraction boiling between 65–70° C. collected. Conversion to the desired amine was effected by adding 213 parts of the $(CH_2=CClCH_2)_2NCN$ so prepared to a solution of 169 parts of concentrated sulfuric acid in 510 parts of water. The reaction mixture was heated at gentle reflux for 6 hours, cooled to room temperature and neutralized by adding 264 parts of sodium hydroxide in 482 parts of water. The stirred reaction mixture was distilled until no amine separated from a test portion of the distillate. Solid potassium hydroxide, 283 parts, was added to the distillate and the mixture kept cool while the potassium hydroxide was dissolving. The amine was then separated, dried over sodium hydroxide and distilled in vacuo collecting the fraction boiling 49–50° C./1 mm. Analysis gave 8.4% nitrogen and 42.4% chlorine as compared to 8.4% nitrogen and 42.7% chlorine calculated for $C_6H_9Cl_2N$.

The sodium salt of bis(2-chloroallyl)dithiocarbamic acid was produced by following the dithiocarbamate procedure as set forth in Examples 1–4 inclusive but using as a charge therefor 30 parts (0.18 mole) of bis(2-chloroallyl)amine in 250 parts of water with 28.8 parts (0.18 mole) of 25% caustic soda and 13.7 parts (0.18 mole) of carbon disulfide. The sodium salt of the dithiocarbamic acid described has the structural formula:

$$(CH_2=CClCH_2)_2NCSSNa$$

As in the previous examples, the copper, zinc, cadmium, iron and the like salts are readily obtainable from the solution of the sodium salt. The zinc salt melts at 106–110° C. and the cadmium salt melts at 112–114° C. The dimethyl cyclohexylamine salt, prepared as described in Example 3 except that the reaction was carried out in a petroleum solvent, had a melting point of 98–99° C. Analysis gave 7.77% nitrogen and 17.39% sulfur as compared to 7.58% nitrogen and 17.36% sulfur calculated for $C_{15}H_{26}Cl_2N_2S_2$.

Thiuram sulfides

Closely related to the dithiocarbamates in structure are the thiuram compounds, both the thiuram mono- and di-sulfides. These compounds have been produced containing the characteristic grouping previously disclosed and hence are within the scope of the present invention. Such thiuram compounds may be represented by the following formula:

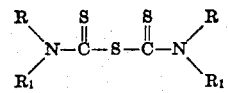

where R represents an alkyl or an aryl grouping and $R_1$ represents a halogen substituted alkenyl group. A method of producing a new product of the type shown is set forth in the following example:

EXAMPLE 6

The amine employed, namely N-(2-chloroallyl)cyclohexylamine, is described in the first paragraph of Example 2 previously shown. For the production of the thiuram compound, 86.8 parts (0.5 mole) of the amine were mixed well with 1000 parts of water and 80 parts (0.5 mole) of 25% caustic soda solution. To this stirred solution, held within 25–30° C., there were slowly added 38 parts (0.5 mole) of carbon disulfide and the mass stirred for an additional 3 hours. Thereupon there were added 75.8 parts (0.5 mole) of diethyl sulfocarbamic chloride and agitation continued for about 5 hours. The entire mixture was then extracted with ether, the ether extract was washed with water until neutral to litmus and then was dried over anhydrous sodium sulfate. After removal of the ether in vacuo, an amber colored viscous oil was obtained of the formula $$C_6H_{11}N(CS)S(SC)N(C_2H_5)_2$$
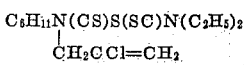
$$\quad CH_2CCl=CH_2$$

This product of empirical formula $C_{15}H_{25}ClN_2S_3$ was analyzed and found to contain 7.77% nitrogen as compared with 7.65% theory content. The product, N-(2-chloroallyl) - N - cyclohexyl - N,N' - diethyl bis(thiocarbamyl)sulfide, is soluble in ether, acetone, chloroform, ethyl acetate and is insoluble in water.

EXAMPLE 7

Employing as the amine 93.7 parts (0.5 mole) of N-(3-chloro-2-butenyl)cyclohexylamine obtained as described in the first paragraph of Example 1 of this specification and proceeding otherwise with the same charge of the same ingredients shown in Example 6 herein, there was obtained N-(3-chloro-2-butenyl) - N - cyclohexyl-N',N'-diethyl bis(thiocarbamyl)sulfide of the formula:

$$C_6H_{11}N(CS)S(SC)N(C_2H_5)_2$$
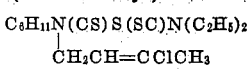
$$\quad CH_2CH=CClCH_3$$

This product also is an amber colored viscous oil that is insoluble in water and soluble in ether, acetone, benzene, chloroform and ethyl acetate. Theory content of chlorine is 9.35%. Found 9.39% by analysis.

EXAMPLE 8

Employing as an amine 66.8 parts (0.5 mole) of 2-chloro-N-isopropyl allylamine, obtained as described in the first paragraph of Example 3 hereinbefore described, and proceeding otherwise as just described in the procedures of Examples 6 and 7, there was obtained another thiuram sulfide product of the formula:

$$(CH_3)_2CHN(CS)S(SC)N(C_2H_5)_2$$
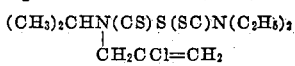
$$\quad CH_2CCl=CH_2$$

This product was semi-solid and checked with experimental error on analysis for nitrogen and chlorine for the formula shown.

EXAMPLE 9

A thiuram disulfide of the formula $$(CH_3)_2CHN(CS)SS(SC)NCH(CH_3)_2$$
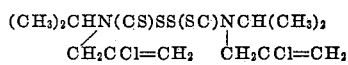
$$CH_2CCl=CH_2 \quad CH_2CCl=CH_2$$

was obtained by mixing together 66.8 parts (0.5 mole) of 2-chloro-N-isopropyl allylamine (employed in Example 8), 500 parts of water and 80 parts (0.5 mole) of 25% caustic soda solution and slowly adding thereto 38 parts (0.5 mole) of carbon disulfide while maintaining the temperature below 30° C. After stirring for an hour longer the mass was then cooled to a temperature of 3–6° C. and held thereat while slowly adding a solution of 59.2 parts (0.26 mole) of ammonium persulfate in 400 parts of water. Stirring was continued for about an hour with cooling means removed and then 200 parts of ethyl ether added with some additional stirring. The solid product was filtered off, washed with water until neutral and air dried. The disulfide product melted at 103–104° C., was insoluble in water and ether and soluble in benzene, acetone, chloroform and ethyl acetate. Analysis of the product of empirical formula $$C_{14}H_{22}Cl_2N_2S_4$$

for theory nitrogen of 6.71% and theory sulfur of 30.72% resulted respectively in 6.71% and 30.86%.

Esters

Dithiocarbamates of the preferred new type, namely the alkyl or aryl, halogen substituted alkenyl dithiocarbamates, also have been obtained as esters of the dithiocarbamate itself in addition to the metallic salts and thiuram type compounds previously described. Such esters are produced from the sodium dithiocarbamic acids as are shown below.

EXAMPLE 10

Proceeding by the directions set forth in Example 1, and duplicating the second paragraph of that example, the product, namely sodium N-(3-chloro-2-butenyl)cyclohexyldithiocarbamate, is heated for substantially 18 hours at 90–95° C. with the addition of 15.6 parts (0.125 mole) of 1,4-dichloro-2-butene. At the end of the heating period the mixture is cooled to about 75° C., the aqueous layer is decanted, and the residue is treated with approximately 300 cc. of a petroleum hydrocarbon solvent, preferably one known as Skellysolve C. The mixture is then filtered and the solid product is dried at room temperature. The crude product so obtained melts at about 135–138° C. and after recrystallization from ethyl acetate melts at 140–142° C. The ester has the following structure:

$$C_6H_{11}NCSSCH_2CH=CHCH_2SSCNC_6H_{11}$$
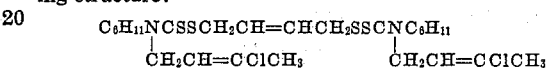
$$\quad CH_2CH=CClCH_3 \quad\quad CH_2CH=CClCH_3$$

The above corresponds to the empirical formula $$C_{26}H_{40}Cl_2N_2S_4$$

and should therefore contain 4.83% nitrogen, 22.12% sulfur and 12.23% chlorine. Analysis yielded the following results respectively of the elements mentioned, namely 5.07%, 22.22% and 12.14%.

Other esters of N-(3-chloro-2-butenyl)cyclohexyl dithiocarbamic acid were prepared as follows:

A. Allyl N-(3 - chloro-2-butenyl)cyclohexyldithiocarbamate, an amber colored oil of the formula:

$$C_6H_{11}NCSSCH_2CH=CH_2$$
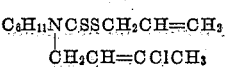
$$\quad CH_2CH=CClCH_3$$

was obtained by adding to an aqueous solution of sodium N-(3-chloro-2-butenyl)cyclohexyl dithiocarbamate an equimolar proportion of allyl chloride. There was a temperature rise from 26 to 31° C. in 10 minutes. The reaction mixture was stirred at room temperature for 6 hours and then extracted with ethyl ether. The ether extract was washed with water until the washings were neutral to litmus, dried over sodium sulfate and the ether removed in vacuo. The yield was 82% of the theoretical. Analysis gave 4.70% nitrogen as compared to 4.61% calculated for $C_{14}H_{22}ClNS_2$.

B. Acetonyl N-(3-chloro - 2 - butenyl)cyclohexyldithiocarbamate of the formula:

$$C_6H_{11}NCSSCH_2COCH_3$$
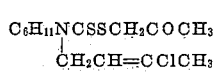
$$\quad CH_2CH=CClCH_3$$

was prepared by replacing the allyl chloride of A. above with an equimolar proportion of monochloracetone. The product was a tan colored solid melting at 67–69° C., insoluble in water, soluble in ether, acetone, benzene, heptane, chloroform, ethyl alcohol and ethyl acetate and corresponding to the empirical formula $C_{14}H_{22}ClNOS_2$.

C. Butyl N-(3 - chloro-2-butenyl)cyclohexydithiocarbamate was prepared as in A. above but replacing the allyl chloride with an equimolar proportion of butyl chloride. The product was an amber colored oil insoluble in water and soluble in ether, acetone, benzene, heptane, chloroform, ethyl alcohol and ethyl acetate, and of the formula:

$$C_6H_{11}NCSSCH_2CH_2CH_2CH_3$$
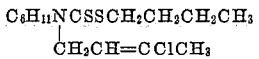
$$\quad CH_2CH=CClCH_3$$

corresponding to the empirical formula $C_{15}H_{26}ClNS_2$.

D. 2-dimethylaminoethyl N-(3-chloro-2-butenyl)cyclohexyldithiocarbamate was also prepared as in A. above but replacing the allyl chloride with an equimolar proportion of 2-dimethylaminoethyl chloride and the mixture heated at 50–60° C. for 5 hours before extraction with ethyl ether. The product was an amber colored oil of the formula:

$$C_6H_{11}NCSSCH_2CH_2N(CH_3)_2$$
$$|$$
$$CH_2CH=CClCH_3$$

It analyzed 8.39% nitrogen, 19.24% sulfur and 10.69% chlorine compared to 8.36% nitrogen, 19.14% sulfur and 10.59% chlorine calculated for $C_{15}H_{27}ClN_2S_2$.

E. 2-carbamoylethyl N-(3-chloro-2-butenyl)cyclohexyldithiocarbamate was again prepared as in A. above but replacing the allyl chloride with an equimolar proportion of acrylamide and heating the reaction mixture at 50–60° C. for 48 hours and then cooled to 25° C. before extraction with ethyl ether. The product was a semi-solid of the formula $$C_6H_{11}NCSSCH_2CH_2CONH_2$$
$$|$$
$$CH_2CH=CClCH_3$$

Analysis gave 10.67% chlorine as compared to 10.59% calculated for $C_{14}H_{23}ClN_2OS_2$.

EXAMPLE 11

The sodium salt of N-(2-chloroallyl)cyclohexyldithiocarbamic acid obtained as described in Example 2 hereof, was treated with an equimolar quantity of allyl chloride at room temperature and was stirred for about 6 hours and then extracted with ether. The extract was washed with water to neutrality by test with litmus, dried over anhydrous sodium sulfate and the ether removed in vacuo. The product, allyl N-(2-chloroallyl)-N-cyclohexyldithiocarbamate, of the structure $$C_6H_{11}NCSSCH_2CH=CH_2$$
$$|$$
$$CH_2CCl=CH_2$$

was an amber oil having the molecular formula $$C_{13}H_{20}ClNS_2$$

and on analysis contained 5.11% nitrogen as compared with 4.83% nitrogen by theory.

A. Again proceeding as in Example 11, except that in place of allyl chloride there was taken one-half the molar equivalent of 1,4-dichloro-2-butene, the reaction mixture stirred for 24 hours at 95–100° C. and a petroleum hydrocarbon, such as Skellysolve C used, there was obtained 2-butene-1,4-dithiol bis[N-(2-chloroallyl)-N-cyclohexyldithiocarbamate] having a melting point after recrystallization from ethyl acetate of 134–135° C. Analysis gave 5.34% nitrogen, 23.21% sulfur and 12.17% chlorine compared to 5.08% nitrogen, 23.25% sulfur and 12.85% chlorine calculated for $C_{24}H_{36}Cl_2N_2S_4$.

Other derivatives of N-2-chloroallyl-N-cyclohexyldithiocarbamate are the following:

B. N,N-dimethylcyclohexylamine salt of N-(2-chloroallyl)-N-cyclohexyldithiocarbamic acid, a tan colored solid melting at 96–97° C. after recrystallization from ethyl alcohol. This product is insoluble in ether, heptane and cold water, is slightly soluble in hot water, and readily soluble in acetone, chloroform, benzene, ethyl alcohol and ethyl acetate. It has the formula:

$$C_6H_{11}NCSSHN(CH_3)_2C_6H_{11}$$
$$|$$
$$CH_2CCl=CH_2$$

Analysis gave 7.47% nitrogen, 16.96% sulfur and 9.79% chlorine compared to 7.43% nitrogen, 17.00% sulfur and 9.40% chlorine calculated for $C_{18}H_{33}ClN_2S_2$.

C. N-(2-chloroallyl)-N-cyclohexylamine salt of N-(2-chloroallyl)-N-cyclohexyldithiocarbamic acid, a tan colored solid melting at 79–81° C. The product is insoluble in water and soluble in ether, acetone, benzene, chloroform and ethyl acetate. It has the structure $$C_6H_{11}NCSSHNHC_6H_{11}$$
$$\diagup \qquad \diagdown$$
$$CH_2CCl=CH_2 \quad CH_2CCl=CH_2$$

The product was identified by analysis. The empirical formula $C_{19}H_{32}Cl_2N_2S_2$ requires for theory content 6.61% nitrogen, 15.14% sulfur and 16.74% chlorine.

The analytical results were 6.98%, 15.04% and 16.89% respectively.

D. Acetonyl N-(2-chloroallyl)cyclohexyldithiocarbamate, an amber colored oil which is insoluble in water and soluble in ether, acetone, benzene, heptane, chloroform, ethyl alcohol and ethyl acetate. It possesses the structure:

$$C_6H_{11}NCSSCH_2COCH_3$$
$$|$$
$$CH_2CCl=CH_2$$

E. Butyl N-(2-chloroallyl) cyclohexyldithiocarbamate, an amber colored oil having identical solvent characteristics as enumerated in D above. It possesses the structure:

$$C_6H_{11}NCSS(CH_2)_3CH_3$$
$$|$$
$$CH_2CCl=CH_2$$

F. 2-dimethylaminoethyl N-(2-chloroallyl)cyclohexyldithiocarbamate, an amber colored oil possessing the structure $$C_6H_{11}NCSSCH_2CH_2N(CH_3)_2$$
$$|$$
$$CH_2CCl=CH_2$$

Analysis gave 8.69% nitrogen, 20.06% sulfur and 11.03% chlorine compared to 8.73% nitrogen, 19.98% sulfur and 11.04 chlorine calculated for $C_{14}H_{25}ClN_2S_2$.

Other types of esters also obtainable from the new dithiocarbamates disclosed and described are esters of N-(2-chloroallyl)isopropyldithiocarbamic acid which are obtainable as shown in the following examples of the invention.

EXAMPLE 12

The sodium salt of N-(2-chloroallyl)isopropyldithiocarbamic acid obtained as described in Example 3 hereinbefore set forth, was treated with an equimolar quantity of allyl chloride in the manner as described in Example 11 except that after addition of allyl chloride, agitation proceeded for about 5 hours at a temperature of 50–60° C., then cooled to room temperature, ether extracted and the solvent removed. The product was an amber oil of the structure $$(CH_3)_2CHNCSSCH_2CH=CH_2$$
$$|$$
$$CH_2CCl=CH_2$$

The allyl N-(2-chloroallyl)isopropyldithiocarbamate so obtained possesses the empirical formula $C_{10}H_{16}ClNS_2$ and by theory should contain 5.61% nitrogen, 26.67% sulfur and 14.19% chlorine. Analysis yielded the following results, for these constituents respectively: 5.24%, 25.87% and 14.05%.

A. Again proceeding as in Example 12, except that in place of allyl chloride there was taken one-half the molar equivalent of 1,4-dichloro-2-butene, and the final heating step of about 15 hours at 90–95° C. was followed, there was obtained 2-butene-1,4-dithiol bis[N-(2-chloroallyl)isopropyldithiocarbamate], a solid melting at 99–100° C. after recrystallization from ethyl alcohol and possessing the structure $$(CH_3)_2CHNCSSCH_2CH=CHCH_2SSCNCH(CH_3)_2$$
$$| \qquad\qquad\qquad |$$
$$CH_2CCl=CH_2 \qquad CH_2CCl=CH_2$$

This product of empirical formula $C_{18}H_{28}Cl_2N_2S_4$ was identified by analysis with the results:

|  | Percent theory | Percent found |
|---|---|---|
| Nitrogen | 5.94 | 5.89 |
| Sulfur | 27.20 | 27.26 |

Other derivatives of N-(2-chloroallyl)isopropyldithiocarbamate are the following:

B. Acetonyl N-(2-chloroallyl)isopropyldithiocarbamate, an amber colored oil insoluble in water and soluble in the various organic solvents named in the previous data forms, for instance in section D of Example 11, has the composition:

$$(CH_3)_2CHNCSSCH_2COCH_3$$
$$|$$
$$CH_2CCl=CH_2$$

C. Butyl N - (2-chloroallyl)isopropyldithiocarbamate, also an amber colored oil of the same solubilities as B above and of the formula $$(CH_3)_2CHNCSSC_4H_9$$
$$|$$
$$CH_2CCl=CH_2$$

D. 2-dimethylamino ethyl N-(2-chloroallyl)isopropyldithiocarbamate, also an amber colored oil and soluble as in B and C above and of the formula $$(CH_3)_2CHNCSSCH_2CH_2N(CH_3)_2$$
$$|$$
$$CH_2CCl=CH_2$$

E. Tert-butyl - N - (2 - chloroallyl)isopropyldithiocarbamate, also an amber colored oil, and having the formula $$(CH_3)_2CHNCSSC(CH_3)_3$$
$$|$$
$$CH_2CCl=CH_2$$

It analyzed 4.95% nitrogen compared to 5.27% calculated for $C_{11}H_{20}ClNS_2$.

F. 2-carbamoylethyl N-(2-chloroallyl)isopropyldithocarbamate, an amber colored oil, and having the formula $$(CH_3)_2CHNCSSCH_2CH_2CONH_2$$
$$|$$
$$CH_2CCl=CH_2$$

It analyzed 9.34% nitrogen compared to 9.98% calculated for $C_{10}H_{17}ClN_2OS_2$.

EXAMPLE 13

As an additional example of another type of ester, the allyl ester of 2-chloro-N-(3-methoxypropyl)allyl dithiocarbamic acid was obtained by employing the sodium salt of the new type dithiocarbamic acid obtained from following the procedure of the second paragraph of Example 4 described hereinbefore and reacting with an equimolar portion of allyl chloride. For this preparation, the procedure described in Example 11 was followed verbatim except that immediately before isolation and purification of the ester, the mixture was heated for about 4 hours at 50–60° C. The ester obtained was an amber colored oil of the formula:

$$CH_3O(CH_2)_3NCSSCH_2CH=CH_2$$
$$|$$
$$CH_2CCl=CH_2$$

The product has the empirical formula $C_{11}H_{18}ClNOS_2$ and by theory should contain 5.00% nitrogen, 22.92% sulfur and 12.67% chlorine. Analysis yielded the following percentages of these elements: 4.94%, 23.03% and 12.70% respectively.

Other examples of different types of esters within the scope of the present invention are esters of bis(2-chloroallyl)-dithiocarbamic acid which are obtainable as shown in the following examples.

EXAMPLE 14

The sodium salt of bis(2-chloroallyl)dithiocarbamic acid obtained as described in Example 5, second paragraph, was treated with an equimolar quantity of allyl chloride as in Example 11 except that heating the mass at 50–60° C. for about 3 hours preceded the purification step. The allyl bis(2-chloroallyl)dithiocarbamate was an amber oil of the formula:

$$(CH_2=CClCH_2)_2NCSSCH_2CH=CH_2$$

Analysis gave 5.10% nitrogen and 25.70% chlorine compared to 4.96% nitrogen and 25.12% chlorine calculated for $C_{10}H_{13}Cl_2NS_2$.

Other esters of a similar type are the following:

A. 2-butene - 1,4 - dithiol bis[di(2-chloroallyl)dithiocarbamate] of the structure $$(CH_2=CClCH_2)_2NCSSCH_2CH=$$
$$CHCH_2SSCN(CH_2CCl=CH_2)_2$$

was obtained by reacting the same sodium dithiocarbamate of Example 5 with one-half molar quantity of 1,4-dichloro-2-butene at room temperature. The product was an amber colored oil which upon analysis gave 5.18% nitrogen, 23.58% sulfur and 26.70% chlorine compared to 5.22% nitrogen, 23.91% sulfur and 26.44% chlorine calculated for $C_{18}H_{22}Cl_4N_2S_4$.

B. Butyl bis(2-chloroallyl)dithiocarbamate was obtained by reacting the sodium dithiocarbamate of Example 5 with an equimolar quantity of butyl bromide. The mass was heated at 50–60° C. for 4 hours and then cooled to room temperature. After extracting with ethyl ether, the ether solution was washed with water until neutral to litmus, dried over sodium sulfate and the ether removed in vacuo. The amber oil so obtained analyzed 5.28% nitrogen and 21.46% sulfur compared to 4.70% nitrogen and 21.50% sulfur calculated for $C_{11}H_{17}Cl_2NS_2$.

C. 2 - dimethylaminoethyl bis(2 - chloroallyl)dithiocarbamate was obtained by reacting the sodium dithiocarbamate of Example 5 with equimolar quantities of 2-chloro-N,N-dimethylethylamine hydrochloride and 25% sodium hydroxide. The stirred reaction mixture was heated at 50–60° C. for 5 hours and cooled to room temperature. After extracting with ethyl ether, the ether solution was washed with water until neutral to litmus, dried over sodium sulfate and the ether removed in vacuo. The amber oil analyzed 9.13% nitrogen and 22.72% chlorine compared to 8.94% nitrogen and 22.63% chlorine calculated for $C_{11}H_{18}Cl_2N_2S_2$.

D. Acetonyl (2-chloroallyl)dithiocarbamate was obtained by reacting the sodium dithiocarbamate of Example 5 with an equimolar quantity of monochloracetone. The stirred reaction mixture was heated at 50–60° C. for 4 hours and then cooled to 25° C., extracted with ethyl ether, the ether solution washed with water until neutral to litmus, dried over sodium sulfate and the ether removed in vacuo. The amber oil analyzed 4.76% nitrogen, 21.47% sulfur and 23.48% chlorine compared to 4.70% nitrogen, 21.50% sulfur and 23.78% chlorine calculated for $C_{10}H_{13}Cl_2NOS_2$.

E. 2-carbamoylethyl bis(2 - chloroallyl)dithiocarbomate was obtained by reacting the sodium dithiocarbamate of Example 5 with an equimolar quantity of acrylamide. The stirred reaction mixture was heated at 50–60° C. for 48 hours and after cooling to 25° C. the reaction mixture was extracted with ethyl ether. The ether extract was washed with water until neutral to litmus and dried over sodium sulfate. Upon removal of the ether in vacuo an amber oil resulted analyzing 8.24% nitrogen as compared to 8.94% calculated for $C_{10}H_{14}Cl_2N_2OS_2$.

A further embodiment of the invention is illustrated by the cyanoalkyl esters of haloalkenyl alkyl or aralkyl dithiocarbamates. An example of such esters are the 2-cyanoethyl esters, which most readily are obtained by reacting acrylonitrile with the various sodium dithiocarbamates comprising the present invention. The following illustrate the process in question.

EXAMPLE 15

The sodium salt of N-(2-chloroallyl)cyclohexyl dithiocarbamic acid, obtained as described by the process set forth in the second paragraph of Example 2 hereinbefore, is treated with an equimolar quantity of acrylonitrile and stirred for 6–7 hours at room temperature, then extracted with ether, the ethereal solution water washed to neutrality to litmus, dried over anhydrous sodium sulfate and the ether then removed in vacuo. The product, 2-cyanoethyl N-(2-chloroallyl)cyclohexyldithiocarbamate, is an amber colored oil of the structure $$C_6H_{11}NCSSCH_2CH_2CN$$
$$|$$
$$CH_2CCl=CH_2$$

Analysis for nitrogen content (found 9.21%, theory 9.25%) confirmed the empirical formula $C_{13}H_{19}ClN_2S_2$.

Other 2-cyanoethyl esters of the various new haloalkenyl dithiocarbamates have been produced as are now set forth:

A. 2 - cyanoethyl[N - (3-chloro-2-butenyl)cyclohexyldithiocarbamate], of the structure:

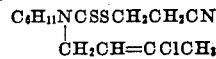

is obtained by reacting the sodium dithiocarbamate produced by following the procedure described in the second paragraph of Example 1, with an equimolar quantity of acrylonitrile by the process described in Example 15. The product, after recrystallization from ethyl alcohol, melts at 81–82° C. and its composition, for the empirical formula $C_{14}H_{21}ClN_2S_2$, confirmed by analysis as follows:

|  | Percent theory | Percent found |
| --- | --- | --- |
| Nitrogen | 8.84 | 9.37 |
| Sulfur | 20.24 | 20.13 |
| Chlorine | 11.19 | 11.41 |

B. 2-cyanoethyl N - (2 - chloroallyl)isopropyldithiocarbamate, having the structure

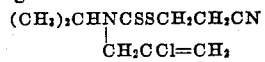

is obtained by reacting the sodium dithiocarbamate produced as described by the process hereinbefore set forth in the second paragraph of Example 3, with an equimolar quantity of acrylonitrile by following the process of Example 15 except that immediately preceding ether extraction, the mixture was heated at 50–60° C. for about 5 hours and cooled. The ester is an amber colored oil and analysis for nitrogen (found 10.82%, theory 10.66%) confirmed the empirical formula $C_{10}H_{15}ClN_2S_2$.

C. 2-cyanoethyl bis(2-chloroallyl)dithiocarbamate, $$(CH_2=CClCH_2)_2NCSSCH_2CH_2CN$$

which is an amber oil and was obtained by the process of compound B above by reacting equimolar quantities of acrylonitrile with sodium bis(2-chloroallyl)dithiocarbamate obtained as described in the second paragraph of Example 5. Anlysis for nitrogen content confirmed the empirical formula $C_{10}H_{12}Cl_2N_2S_2$.

Amine salts

Instead of producing sodium salts of the various halogen alkenyl dithiocarbamates described hereinbefore, it is possible and within the scope of the present invention to obtain amine salts of the dithiocarbamates as are shown by the following examples. To prepare such amine salts, the amine is reacted with one-half the molar quantity of carbon disulfide required to produce a dithiocarbamate.

EXAMPLE 16

N-(3-chloro-2-butenyl)cyclohexylamine (93.6 parts, 0.5 mole), the amine formed by the process described in the first paragraph of Example 1, was mixed with 19 parts (0.25 mole) of carbon disulfide and approximately 200 parts of heptane and the reaction mixture stirred for 3 hours. The resulting solid product was filtered off and air dried. The product, melting at 70–75° C., has the formula:

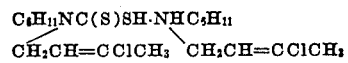

Identification was made by analysis, assuming an empirical formula required by the above structure of $$C_{21}H_{36}Cl_2N_2S_2$$

with the following results:

|  | Percent theory | Percent found |
| --- | --- | --- |
| Nitrogen | 6.20 | 6.46 |
| Sulfur | 14.20 | 13.68 |

A. Proceeding in the same manner and employing 2-chloro-N-isopropyl allylamine, the amine produced by following the procedure described in the first paragraph of Example 3, hereinbefore shown, there was formed the product

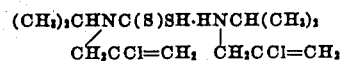

which was identified by analysis.

B. Again proceeding as shown in Example 16 except no solvent was used and employing bis(2-chloroallyl)amine, the amine obtained by the procedure of the first paragraph of Example 5, there was obtained after allowing the reaction mixture to stand 48 hours, a semi-solid product of the constitution:

$$(CH_2=CClCH_2)_2NCSSHNH(CH_2CCl=CH_2)_2$$

which requires the empirical formula $C_{13}H_{18}Cl_4N_2S_2$ and which was confirmed by analysis for nitrogen (theory content 6.83%, found 6.17%).

EXAMPLE 17

The N,N-dimethylcyclohexylamine salt of N-(3-chloro-2-butenyl)cyclohexyldithiocarbamic acid was prepared. A yellow solid melting at 78–80° C. and of the formula

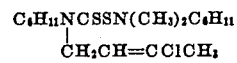

was obtained. Analysis gave 7.33% nitrogen, 16.14% sulfur and 9.39% chlorine compared to 7.16% nitrogen, 16.40% sulfur and 9.07% chlorine calculated for $C_{19}H_{35}ClN_2S_2$.

The various derivatives of the halogen alkenyl substituted dithiocarbamates as disclosed herein are of utility in a plurality of important applications. For example, the sodium salts and the thiuram mono- and disulfides and the amine salts are effective as accelerators of the vulcanization of rubber and even as vulcanizing agents thereof. The copper, zinc and other metallic salts are useful fungicides. The esters, salts serve as useful insecticides, nematocides, bactericides and herbicides.

It is intended to cover all changes and modifications of the examples of the invention herein chosen for purposes of disclosure which do not constitute departures from the spirit and scope of the invention.

What is claimed is:

1. A compound possessing the structure

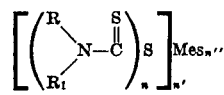

where R represents a radical containing less than seven carbon atoms selected from the class consisting of non-aromatic hydrocarbon, alkoxyalkyl and $R_1$, $R_1$ represents a chlorine substituted lower 2-alkenyl group having the chlorine attached to unsaturated carbon, $n$ and $n'$ represent integers greater than zero, the sum of which is less than four, $n'$ being equal to the valence of Mes when $n''$ is greater than zero, $n''$ represents an integer less than two and Mes is selected from the group consisting of salt forming groups, lower aliphatic hydrocarbon and oxo, carbamyl, cyano and di(loweralkyl)amino substitution products thereof.

2. A compound possessing the structure

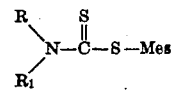

where R represents a lower alkyl group, $R_1$ represents a chloro substituted lower 2-alkenyl group having the chlorine attached to unsaturated carbon and Mes represents a lower aliphatic hydrocarbon group.

3. Allyl N(2-chloroallyl)isopropyldithiocarbamate.
4. A compound possessing the structure

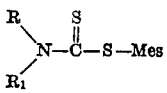

where R represents an aliphatic hydrocarbon group containing less than seven carbon atoms, $R_1$ represents a chlorosubstituted lower 2-alkenyl group having the chlorine attached to unsaturated carbon and Mes represents a 2-di(loweralkyl)aminoethyl group.

5. A compound possessing the structure

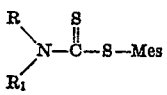

where R represents an aliphatic hydrocarbon group containing less than seven carbon atoms, $R_1$ represents a chlorosubstituted lower 2-alkenyl group, the chlorine being attached to unsaturated carbon, and Mes represents alkali metal.

6. The sodium salt of N-(2-chloroallyl)cyclohexyl dithiocarbamic acid.

7. The sodium salt of N-(2-chloroallyl)isopropyl dithiocarbamic acid.

8. A salt of a dithiocarbamic acid which acid possesses the structure

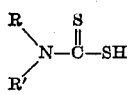

where R represents a non aromatic hydrocarbon radical containing less than seven carbon atoms and R' represents a chloro substituted lower 2-alkenyl group having the chlorine attached to unsaturated carbon.

9. A compound possessing the structure

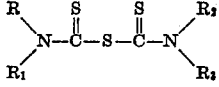

where R, $R_2$ and $R_3$ represent lower alkyl groups and $R_1$ represents a chloro-substituted lower 2-alkenyl radical having the chlorine attached to unsaturated carbon.

References Cited in the file of this patent
UNITED STATES PATENTS

| | | |
|---|---|---|
| 1,869,862 | Orthner | Aug. 2, 1932 |
| 1,972,961 | Tisdale et al. | Sept. 11, 1934 |
| 2,665,285 | Johnson | Jan. 5, 1954 |
| 2,693,485 | Gobeil | Nov. 2, 1954 |